Oct. 11, 1927.
A. G. DALIN
1,645,183
SHOCK ABSORBER
Filed Sept. 15, 1926
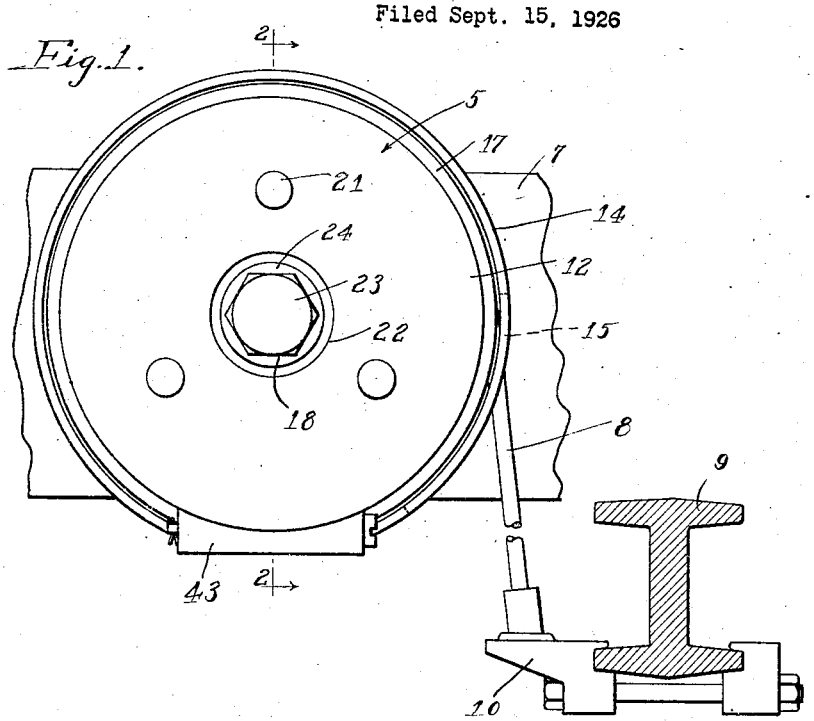
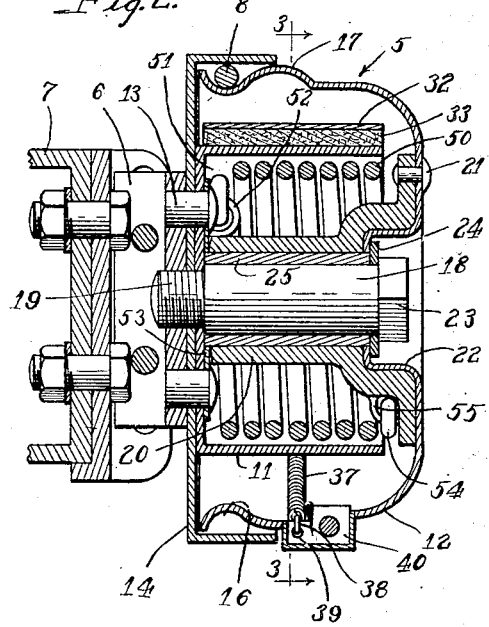
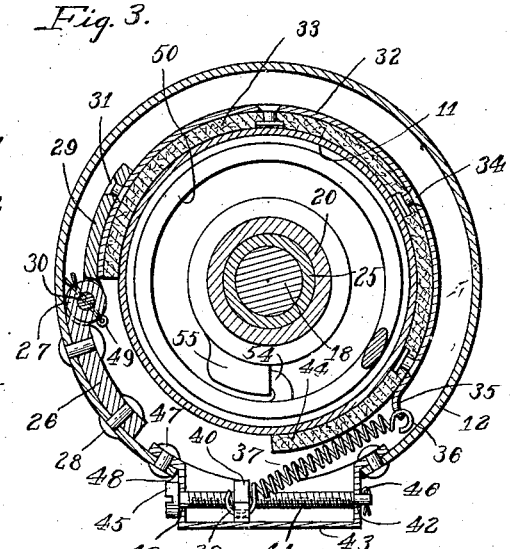
Inventor:
Arvid G. Dalin
By Wilson & McCanna
Attys.

Patented Oct. 11, 1927.

1,645,183

UNITED STATES PATENT OFFICE.

ARVID G. DALIN, OF ROCKFORD, ILLINOIS, ASSIGNOR TO BURD HIGH COMPRESSION RING COMPANY, OF ROCKFORD, ILLINOIS, A CORPORATION OF ILLINOIS.

SHOCK ABSORBER.

Application filed September 15, 1926. Serial No. 135,514.

This invention relates to shock absorbers, and is more particularly concerned with improvements in the type of shock absorber disclosed in the copending application of George H. Higgins, Serial No. 41,574, filed July 6, 1925.

Among the more important objects of the present invention may be enumerated the following:

First, to provide a shock absorber of sturdier and more durable construction than has heretofore been available, characterized principally by the provision of a comparatively wide friction band resembling a shoe due to its proportions and affording more nearly the desired amount of friction to meet all service requirements.

Second, to provide a hinge mounting for the attached end of the friction band which makes the band more readily conformable to the drum on which it operates, simplifies the matters of production and assembling and is generally more reliable than any other kind of fastening inasmuch as shock and vibration will not result in a failure of the parts of the hinge where it might otherwise result in a crystallization and consequent cracking and breaking of another type of fastening, such for example as a leaf spring connection.

Third, the provision of a generally improved construction and arrangement of parts making the device proof against the entry of dirt and water to the friction parts, which would destroy their effectiveness, and with a further view to simplicity and cheapness in construction and ease in assembling.

The invention embraces still other objects and advantages which will appear in the course of the following detailed description having reference to the accompanying drawing wherein—

Fig. 1 is a side view of my improved shock absorber shown mounted on the chassis of an automobile and having its cable connected with the axle, a portion of the chassis appearing in side elevation while the axle appears in section;

Fig. 2 is a vertical axial section taken on the line 2—2 of Fig. 1 looking in the direction of the arrows; and Fig. 3 is a vertical section taken on the line 3—3 of Fig. 2 looking in the direction of the arrows.

Referring to the drawing, the shock absorber 5 is mounted on an adjustable frame bracket 6 or secured in any other manner to the chassis frame 7 or some other part moving therewith. The flexible cable 8 of the shock absorber extends therefrom for connection with the axle 9 as by means of a special axle bracket 10. The operation of shock absorbers, snubbers, and similar retarding or checking devices used on motor vehicles is quite commonly known so that it will suffice to state at this point that in the deflection of the vehicle springs caused by the wheels passing over a rough place in the road, the chassis 7 moves freely toward the axle 9. Suitable means is provided in the shock absorber 5 to take up the slack in the cable 8. Then on the rebound, when the chassis 7 moves away from the axle 9 under the recoil action of the supporting springs, the shock absorber is operated to resist or check the movement of the chassis.

Referring more particularly to Figs. 2 and 3, it will appear that the shock absorber 5 includes an inner fixed drum 11 and an outer relatively rotatable drum or bowl 12 telescoping therewith. The drum 11 is riveted, or otherwise suitably secured as at 13 to the adjustable part of the bracket 6 with a protecting shell or cover 14. The latter, as shown in Fig. 1, has an elongated slot at 15 through which the cable 8 is extended for operation but covers the major portion of the pulley groove 16 provided in the periphery of the drum 12 so as to exclude dirt and water. The drum 12 is suitably provided with a peripheral bead 17 adjacent the groove 16 substantially to close the mouth of the shell 14 and enclose the cable 8 in an obvious manner. A bearing stud or post 18 is provided for the rotary drum 12 having a threaded end 19 engaged in the adjustable part of the bracket 6. The drum 12 is formed from one piece of sheet metal and has a cast bearing sleeve or hub 20 riveted thereto, as shown at 21, the drum having its side wall conformed, as shown at 22, to fit within a depression in the end of the sleeve 20 and provide a socket for the head 23 of the bearing stud 18. A washer 24 is provided on the stud 18 under the head 23 and serves to hold the drum 12 in position on the stud. The sleeve 20 has an oilless, graphite-impregnated bushing 25 inserted therein with a press fit to make the operation of the drum as smooth and noiseless as possible and to make it practically unnecessary to lubricate the shock absorber after the installation thereof. The operation of the cable so close to the root of the stud or post 18 is also of apparent advantage since it reduces the leverage tending to flex the post. The device is therefore less apt to become loose on its bracket or break off entirely.

The rotary drum 12 has one leaf 26 of a but hinge 27 rigidly secured thereto as by rivets 28, the other leaf 29 being offset inwardly relative to the leaf 26 and freely movable on the pivot pin 30 and being riveted, as shown at 31, to a resilient friction band 32 surrounding a substantial portion of the periphery of the drum 11, as appears in Fig. 3. The band 32, as appears in Fig. 2, is relatively wide so that its lining or facing 33 of friction material engages substantially the entire width of the drum 11. In this way the maximum available friction is secured and consequently there is the best shock absorbing or snubbing effect. The band 32 with its lining 33 riveted thereto, as at 34, may be made relatively short so as to surround only about three-fourths of the circumference of the drum 11, as appears in Fig. 3. In other words, the proportionment of the band makes it resemble a shoe. The lining 33 is extended beyond the free end of the band 32 a substantial distance, as appears in Fig. 3, for a purpose presently to be referred to. The band has the free end thereof bent outwardly, as at 35, to receive the looped end 36 of a coiled tension spring 37. The other end 38 of the spring 37 is received in an opening 39 provided in an offset portion of a nut 40. The latter is threadedly engaged on a screw 41 received at opposite ends in openings 42 provided in the end walls of a hollow radially offset portion 43 provided on the drum 12. The nut 40, by engagement with the inside walls of the offset portion 43, is held against rotation with respect to the screw 41 and is guided for movement lengthwise with respect to the screw in the adjustment of the latter in an obvious manner. As a result of this movement of the nut 40 the tension of the spring 37 is adjusted. At this point it may be remarked that the extended end 44 of the friction band lining 33 positively prevents engagement of the spring with the drum in any position of adjustment of the nut 40 and regardless of how the spring happens to be assembled in the shock absorber. There will thus be no possibility of a scraping noise in the operation of the shock absorber. It will appear that the head 45 of the screw 41 holds the same against endwise movement. A cotter pin 46 may also be provided for the other end of the screw to prevent its becoming dislodged from the opening 42 in the event the tension of the spring 37 proves insufficient to keep the screw 41 in position. As illustrated in Fig. 3, the offset portion 43 of the drum is in the form of a separate sheet metal stamping of cupped form riveted, as shown at 47, in an opening 48 in the peripheral wall of the drum 12. It will appear from this description that the band 32 is very sturdily mounted. The flexibility afforded at the hinge 27 makes the band easily conformable to the drum regardless of the amount of wear of the lining. The usual amount of shock and jar to which the band is subjected in operation will not result in a failure of the hinge. Where the band was mounted as by means of a resilient leaf spring rigidly secured to the wall of the drum, it was found that the constant flexing and the repeated shocks and jars eventually crystallized the metal and a cracking or breaking off of the band from its fastening resulted. Thus, the shock absorbers were frequently thrown out of commission. The present construction is also much simpler to manufacture and easier to assemble. If desired, the pin 30 may be inserted in the assembling of the band in the drum 12 after the leaf 26 has been riveted in place. The fact that the pin 30 is removable makes it a simple matter to remove the band when worn out and a new one may be installed. A cotter pin 49 may be provided passing through one of the ears on the leaf 26 and the pin 30 to secure the pin permanently in place.

The drum 12 normally tends to rotate in a counter clockwise direction as the parts are viewed in Fig. 1. Thus, the cable 8, which has its inner end affixed to the drum, is always under a certain tension. A coiled torsion spring 50 has one end 51 thereof hooked for reception in an ear 52 struck up from a plate 53 riveted with the drum 11 and shell 14 to the bracket 6. The other end 54 is also hooked to engage in a socket 55 cast in the end of the bearing sleeve 20.

In operation, as the chassis 7 approaches the axle 9 in the flexing of the vehicle supporting springs, any slack in the cable 8 is taken up by the spring 50 causing the drum 12 to rotate in a counter clockwise direction in the manner previously referred to. In the rebound action of the vehicle springs the chassis 7 moves away from the axle 9 and as a result the drum 12 is turned in a clockwise direction as viewed in Fig. 1 (but in a counter clockwise direction as viewed in Fig. 3). As a result, the friction band exerts a wrapping action on the drum 11 which resists the rotation of the drum 12 so that the shock incident to the car riding over a rough place in the road is effectively absorbed. The degree to which the friction band brakes the motion of the drum 12 depends on the adjusted tension of the spring 37. In the rotation of the drum 12 in the opposite direction the band allows relatively free movement as in that case there is a tendency for the same to unwrap. This action is well understood and requires no lengthy explanation.

I claim:

1. A shock absorber comprising a rotary drum, a fixed pivot therefor, a relatively stationary drum, spring means normally tending to rotate said rotary drum in one direction, flexible means for rotating the same in the opposite direction against the action of said spring means, a friction band hingedly mounted at one end on one of said drums and frictionally engaging the other of said drums whereby to resist the turning of said rotary drum in one direction while permitting relatively free movement in the other direction, and spring means attached to the free end of said band for tensioning the same.

2. In a shock absorber as set forth in claim 1, the provision in the hinge mounting of said band of a pin insertible between the relatively pivoting parts of the hinge mounting in the assembling of said band on its drum.

3. A shock absorber comprising an inner fixed drum of relatively small diameter, an outer rotary drum of relatively larger diameter telescoping therewith, said rotary drum having a pivot at the center of the fixed drum whereby an annular space is left between the fixed drum and the rotary drum, a friction band disposed in said space surrounding a portion of the periphery of said fixed drum, spring means acting between said rotary drum and one end of said band for tensioning the same, and means for attaching the other end of said band to the inside of said rotary drum comprising a hinge having one leaf thereof permanently fixed to the inside wall of said rotary drum, the other leaf of said hinge being offset radially inwardly with respect thereto and having the end of said friction band attached thereto.

4. In a shock absorber as set forth in claim 3, the provision in said hinge of a pivot pin insertible between the fixed and the movable leaves of said hinge for assembling said friction band within said rotary drum after the fixed leaf of said hinge has been permanently secured in place therein.

5. A shock absorber comprising an inner fixed drum of relatively small diameter, an outer rotary drum of relatively larger diameter telescoping therewith, said rotary drum having a pivot at the center of said fixed drum whereby an annular space is left between the fixed drum and the rotary drum, spring means normally urging said rotary drum to turn in one direction, flexible means connected with said drum to turn the same in the other direction against the action of said spring means, a friction band disposed in the annular space between the fixed and movable drums fixed at one end to the inside of the rotary drum and surrounding a portion of the periphery of the fixed drum, said band having a lining of friction material thereon, and a tension spring secured to the free end of said band and extending substantially tangentially with respect to said fixed drum for tensioning said band, said band lining being extended beyond the free end of said band between said spring and the periphery of said fixed drum substantially as and for the purpose described.

6. In a shock absorber, a supporting bracket, a fixed drum thereon, a center post fixed therewith, an outer rotary drum bearing on said post and telescoping concentrically with the inner drum, the two drums being of deep cup-shaped form, and the inner drum being substantially smaller in diameter than the outer drum to leave an annular band space therebetween, a shallow cup-shaped cover larger in diameter than both drums fixed with the inner drum and overlapping a narrow marginal edge portion of the outer drum, whereby to close the annular band space between the drums and to provide a slight annular cable space about the outer drum within the flange of the cover, the said cover having a cable opening in the flange thereof, a flexible cable extended through said opening and winding on the perphery of said outer drum close to the edge thereof, and hence close to the root of the center post, a flexible band in the annular band space secured to one of the drums and frictionally engaging the other drum to resist rotation of the rotary drum in one direction, and spring means normally tending to rotate the rotary drum in the other direction.

7. In a shock absorber as set forth in claim 6, wherein the outer rotary drum has the shell thereof formed of sheet metal, the provision of a flared rim at the edge of the flange thereof serving to reinforce the edge portion of the flange while providing one side of an annular recess for the reception of the cable, the said shell being also provided with an annular peripheral bead to define the other side of the recess and keep the cable in place beneath the flange of the cover element, serving also to substantially close the mouth of the cover element to exclude dirt and water from the cable recess.

In witness of the foregoing I affix my signature.

ARVID G. DALIN.